United States Patent
Wheeler et al.

(10) Patent No.: US 6,983,762 B2
(45) Date of Patent: Jan. 10, 2006

(54) PRESSURE REGULATOR FOR A FUEL SUPPLY SYSTEM OF AN INTERNAL COMBUSTION ENGINE

(75) Inventors: Tony Wheeler, Anderson, SC (US); Kasimir Stromski, Filderstadt (DE); Andreas Peetz, Ludwigsburg (DE); Wolfgang Gabauer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/473,619

(22) PCT Filed: Dec. 10, 2002

(86) PCT No.: PCT/DE02/04515

§ 371 (c)(1),
(2), (4) Date: Mar. 22, 2004

(87) PCT Pub. No.: WO03/067077

PCT Pub. Date: Aug. 14, 2003

(65) Prior Publication Data

US 2004/0149338 A1 Aug. 5, 2004

(30) Foreign Application Priority Data

Feb. 2, 2002 (DE) ......................................... 102 04 269

(51) Int. Cl.
*F02M 69/54* (2006.01)
*F16K 15/04* (2006.01)
*G05D 16/02* (2006.01)

(52) U.S. Cl. ...................... 137/539; 137/514; 137/529; 251/337; 123/510

(58) Field of Classification Search ................. 137/539, 137/529, 535, 514, 514.5; 123/510, 514; 251/337

See application file for complete search history.

(56) References Cited

U.S. PATENT DOCUMENTS

| 4,387,715 A | | 6/1983 | Hakim et al. |
| 5,220,941 A | | 6/1993 | Tuckey |
| 5,509,444 A | | 4/1996 | Robinson et al. |
| 5,564,397 A | | 10/1996 | Kleppner et al. |
| 5,655,503 A | * | 8/1997 | Kampichler et al. ........ 123/510 |
| 5,901,742 A | * | 5/1999 | Kleppner et al. ........... 137/508 |
| 6,681,798 B2 | * | 1/2004 | Bueser et al. ................ 137/539 |

FOREIGN PATENT DOCUMENTS

| DE | 32 33 268 A1 | 3/1984 |
| DE | 198 34 140 A1 * | 9/1999 |
| EP | 1 090 657 A2 | 4/2001 |

* cited by examiner

*Primary Examiner*—Ramesh Krishnamurthy
(74) *Attorney, Agent, or Firm*—Ronald E. Greigg

(57) ABSTRACT

The invention relates to a pressure regulator for a fuel delivery system of an internal combustion engine for regulating a fuel pressure, including a valve, which has a valve ball that is pressed against a valve seat in the closed position by the action of a valve leaf spring. A segment of a hemisphere of the valve ball oriented toward the valve leaf spring protrudes into a recess associated with the valve leaf spring. This improves the noise behavior and regulating behavior of the pressure regulator.

12 Claims, 3 Drawing Sheets

PRESSURE REGULATOR FOR A FUEL SUPPLY SYSTEM OF AN INTERNAL COMBUSTION ENGINE

CROSS-REFERENCE TO RELATED APPLICATIONS

This application is a 35 USC 371 application of PCT/DE 02/04515 filed on Dec. 10, 2002.

BACKGROUND OF THE INVENTION

1. Field of the Invention

The invention is directed to an improved pressure regulator for a fuel delivery system of an internal combustion engine for regulating a fuel pressure, including a valve, which has a valve ball that is pressed against a valve seat in the closed position by the action of a valve leaf spring.

2. Description of the Prior Art

A pressure regulator of the type with which this invention is concerned is disclosed in the previously unpublished DE 101 07 223 A1, in which the valve leaf spring is supported in articulating fashion and an arm of the valve leaf spring, which is disposed on the end oriented toward the valve seat in relation to the articulated support, and an arm of the valve leaf spring disposed on the end opposite from the valve seat are supported on a supporting body in such a way that a torque equilibrium prevails in the valve leaf spring. The prestressing force generated by the supporting body is transmitted by the valve leaf spring to the valve ball in the form of a closing force. If fuel pressure prevails in the pressure inlet that is of sufficient magnitude to generate a compressive force that is greater than the closing force acting on the valve ball, then the valve ball lifts up from the valve seat and unblocks a particular opening cross section so that fuel can flow to the pressure outlet.

SUMMARY AND ADVANTAGES OF THE INVENTION

The regulator according to the invention produces an improved noise behavior and improved fuel regulating behavior.

According to a preferred embodiment of the invention, the valve ball protrudes into a recess associated with the ball or the leaf spring and contacts the valve leaf spring; between an edge of the recess and the valve ball, there is a slight amount of play, and the segment of the valve ball is constituted by a spherical segment.

Preferably, the recess is constituted by an annular opening of a damping ring, which is disposed between the valve ball and a surface of the valve leaf spring oriented toward the valve ball and is held against the valve leaf spring by the valve ball. This produces a quasi-positively engaging connection between the valve ball and the damping ring in a plane parallel to the valve leaf spring and friction forces can be generated between the damping ring, the valve leaf spring, and the valve ball, which dampen oscillating movements of the valve ball. As a result, noise caused by oscillations of the valve ball is either perceptibly reduced or no longer occurs at all. Since such a damping ring is relatively small and is situated in the immediate vicinity of the valve leaf spring, it does not disturb a flow of fuel surrounding the valve ball. Furthermore, the friction-based damping ring only damps the oscillation movements of the valve ball, but does not limit its movement play space, so that it is still possible for the valve ball to execute centering movements in the valve seat and the tightness of the valve in the closed position remains assured.

According to a modification of the preferred embodiment, the damping ring is constituted by a ring that is comprised of an elastomer and has a circular cross section. Alternatively, the damping ring can be comprised of a plastic formed body that is produced by means of cutting machining or by means of injection molding. In both cases, it is extremely simple to produce and assemble the damping rings since they are simple, circular components and are simply inserted between the valve leaf spring and valve ball without requiring alteration to the valve leaf spring or the valve ball.

In another embodiment of the invention, oscillations of the valve ball in relation to the valve leaf spring are also damped in that the fuel, which is conveyed into the interior of the pressure regulator and therefore also into the vicinity of the valve ball, constitutes a fluid cushion between the edge of the recess and the segment of the valve ball protruding into it, and this cushion deforms when the valve ball oscillates. In this connection, fluid layers or fluid molecules are moved in relation to one another and internal friction is generated in the fluid cushion, which has a damping effect with regard to oscillations of the valve ball. Because there is still movement play between the edge of the recess and the valve ball, the valve ball is prevented from being guided in a restricted fashion.

According to a modification of this embodiment, the segment of the valve ball is constituted by a spherical segment and the recess is constituted by a groove extending along the longitudinal span of the leaf spring. Because this produces a spatially limited fluid cushion mainly between the longitudinal edge of the groove and the valve ball, this measure predominantly damps oscillations occurring in the direction lateral to the longitudinal span of the valve leaf spring.

On the whole, the deliberate reduction of oscillations and noise achieved with the measures according to the invention result in an improved regulating behavior of the pressure regulator.

BRIEF DESCRIPTION OF THE DRAWINGS

Other features and advantages of the invention will become apparent from the description contained herein below, with reference to the drawings, in which.

DESCRIPTION OF THE PREFERRED EMBODIMENTS

Figure 1:
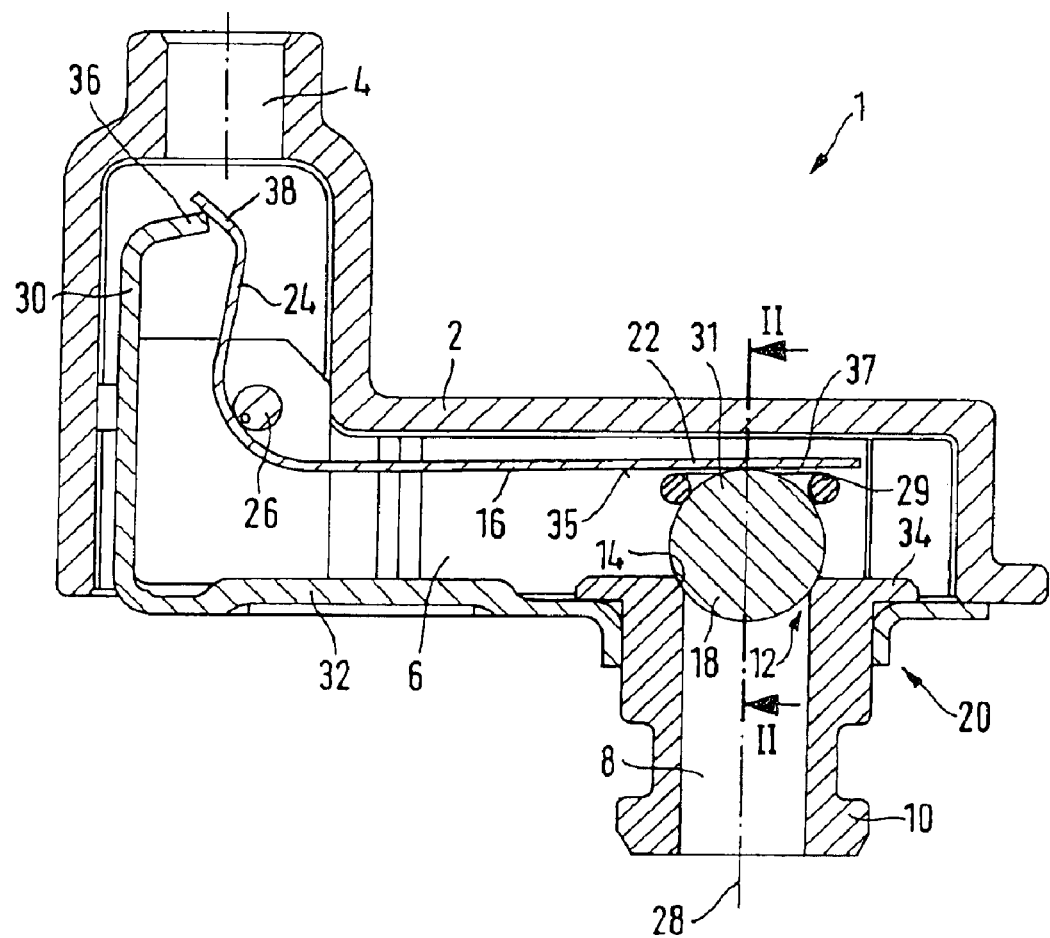
FIG. 1 shows a cross section through a preferred embodiment of a pressure regulator according to the invention.

According to a preferred embodiment, the pressure regulator, which is labeled as a whole in FIG. 1 with the reference numeral 1 and is shown in a closed position there, is fastened to a fuel pump, not shown for reasons of scale, which is disposed in a fuel tank of a motor vehicle, and serves to regulate the fuel pressure in the fuel system of an autoignition internal combustion engine. The pressure regulator 1 has a housing 2 with an L-shaped cross section; in a housing neck that is drawn upward, an opening 4 is provided, which connects an interior 6 of the housing 2 to the fuel tank. At the bottom, a connection fitting 10 that constitutes a pressure inlet 8 protrudes into the housing 2 and is connected to a pressure line, not shown, of the fuel system; fuel returning from a fuel distributor flows through this pressure line.

At the end, the connection fitting 10 is provided with a valve seat 12 that has a conical surface 14 for centering a valve ball 18. Instead of being embodied directly on the connection fitting 10, the valve seat 12 can also be embodied on the housing 2; in this instance, the housing 2 and the valve seat 12 are embodied, for example, as a one-piece injection molded part that has been finished with cutting machining. For example, the cone angle of the conical surface 14 is 60 degrees. The action of a valve leaf spring 16 presses the valve ball 18 against the valve seat 12. The valve leaf spring 16, the valve ball 18, and the valve seat 12 combine to form an overflow valve 20 of the pressure regulator 1. The valve ball 18 can be made of steel, ceramic, or plastic; for example, its diameter is 3 mm to 12 mm.

The valve leaf spring 16 preferably has an angular form, comprised of two arms 22, 24 extending essentially at right angles to each other and can rotate around a fulcrum axle 26, which is supported in the housing 2 and extends crosswise to the longitudinal span of the valve leaf spring 16 and perpendicular to a plane containing the center axis 28 of the valve seat 12. The fulcrum axle 26 also extends in the region of an imaginary abutting line of the two arms 22, 24 of the valve leaf spring 16. For example, the overall length of the coiled valve leaf spring is 10 to 40 mm and its width is approx. 5 mm to 20 mm. The distance of the center axis 28 of the valve seat 12 from the fulcrum axle is preferably 8 mm to 35 mm.

A damping ring 29 is disposed between the valve seat arm 22 of the valve leaf spring 16 oriented toward the valve seat, which arm preferably extends perpendicular to the center axis 28 of the valve seat, and the valve ball 18 whose crown contacts the valve leaf spring 16. More precisely stated, the valve ball 18 protrudes with a spherical segment 31 of its hemisphere oriented toward the valve leaf spring 16 into an annular opening 37 of the damping ring 29 and holds the ring against the valve leaf spring 16. The diameters of the annular opening 37 and the valve ball 18 are preferably selected in such a way that a slight amount of play in the form of a narrow gap 33 remains between the valve leaf spring 16 and the damping ring 29. A prestressing force engages the arm 24 of the valve leaf spring disposed on the end opposite from the valve seat 12 in relation to the fulcrum axis 26 and generates a force on the arm 22 oriented toward the valve seat that pushes the valve ball 18 against the valve seat 12. This prestressing force is preferably produced by a prestressed leaf spring 30, which extends essentially parallel to the arm 24 of the valve leaf spring 16 on the end opposite from the valve seat 12. The prestressed leaf spring 30 is preferably embodied so as to be of one piece with a cover 32 that closes the housing 2 of the pressure regulator 1 at the bottom; in the installed position, this cover 32 is engaged from behind by a radial, outer annular shoulder 34 of the connecting fitting 10, and extends away from this shoulder at right angles. The free end 36 of the prestressed leaf spring 30 is bent toward the arm 24 of the valve leaf spring 16 on the end opposite from the valve seat 12 and engages in a rounded shape 38 on it in such a way that a prestressing force generated by the prestressed leaf spring 30 is introduced essentially at right angles into the arm 24 of the valve leaf spring 16. With its bent end 36, the prestressed leaf spring 30 exerts a torque on the articulatingly supported valve leaf spring 16, which pushes the valve ball 18 against the valve seat 12. The magnitude of the closing force, which acts as a reaction on the top of the valve ball 18 due to the prestressing force of the prestressed leaf spring 30, is produced as a function of the lever ratios selected for the two arms 22, 24. Torque equilibrium then prevails in the valve leaf spring 16.

Figure 2:
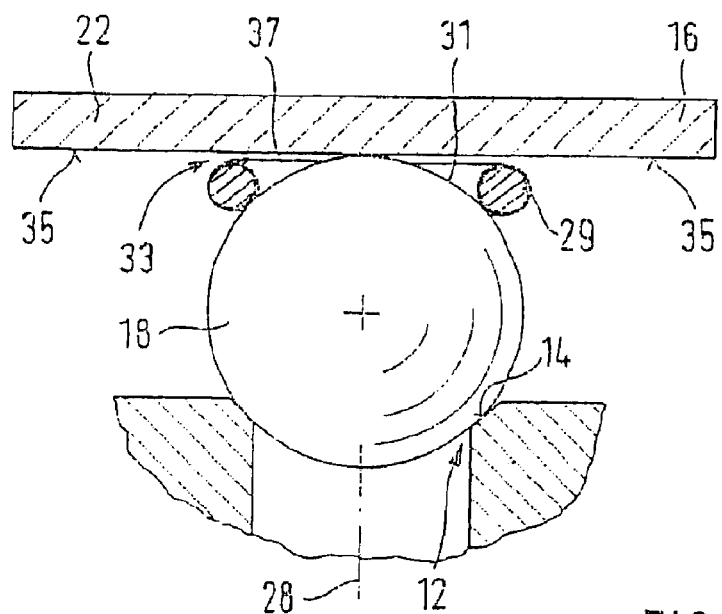
FIG. 2 shows a sectional view along the line II—II in FIG. 1.
Figure 3:
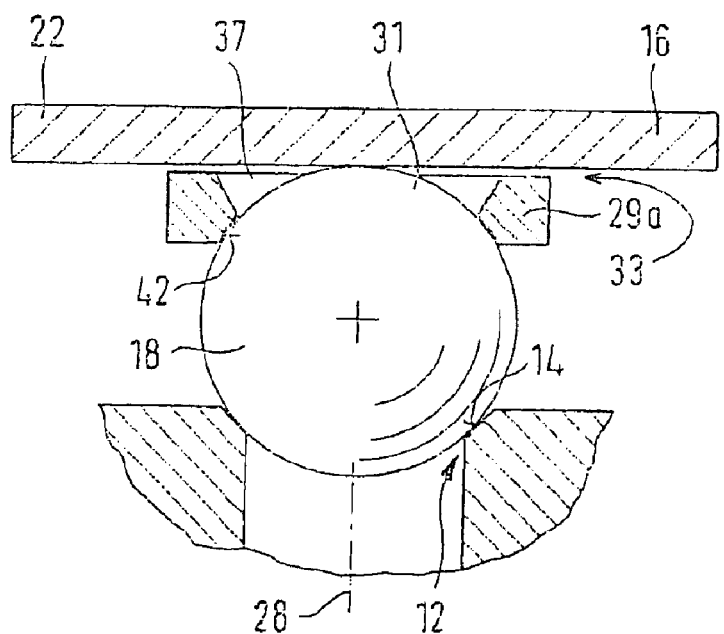
FIG. 3 shows a sectional depiction of another embodiment.

According to the exemplary embodiment in FIG. 2, the circumferential damping ring 29 preferably has a circular cross section and is comprised of an elastomer. Alternatively, the damping ring 29a according to the embodiment in FIG. 3 can be constituted by a plastic formed body that is produced by means of cutting machining or by means of injection molding, whose inner rim oriented toward the valve ball 18 is provided with a bevel 42 or has a seat surface in the form of a spherical zone that is embodied to be complementary to the valve ball 18. Instead of being made of plastic, the damping ring 29, 29a can also be made of another material, for example steel. The decisive factor is that during operation, friction forces are generated between the damping ring 29, 29a, the valve leaf spring 16, and the valve ball 18, which on the one hand, are of sufficient magnitude to damp oscillation movements of the valve ball 18, but on the other hand, are not so great that they prevent the valve ball 18 from being centered in the valve seat 12 when the overflow valve 20 closes. According to another embodiment that is not shown, the damping ring 29, 29a is not placed loosely around the valve ball 18, but instead also contacts the valve leaf spring 16 in addition to the valve ball 18 without movement play, for example by being clamped between the valve ball 18 and the valve leaf spring 16 and thus being elastically spread out.

Figure 4:
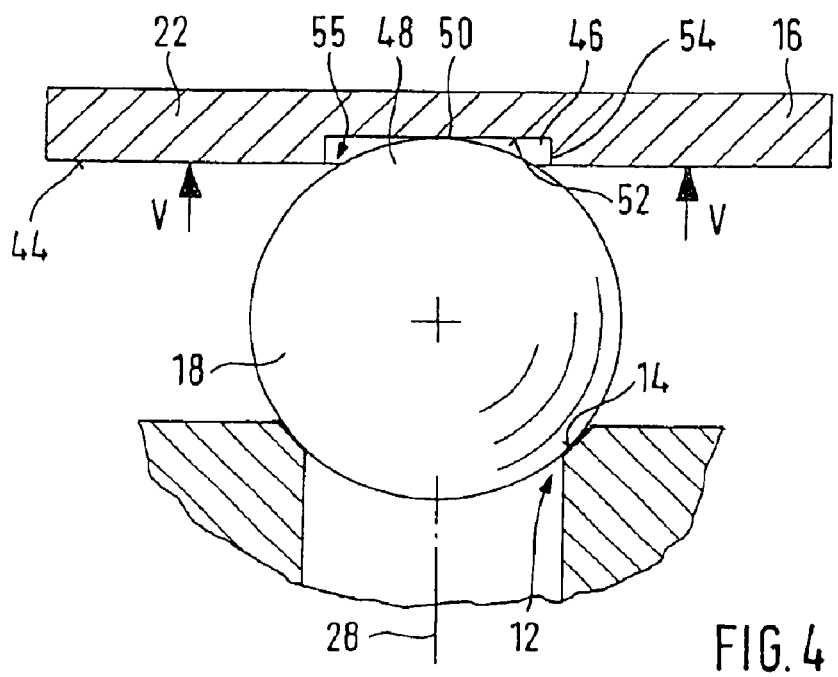
FIG. 4 shows a sectional depiction of another embodiment.
Figure 5:
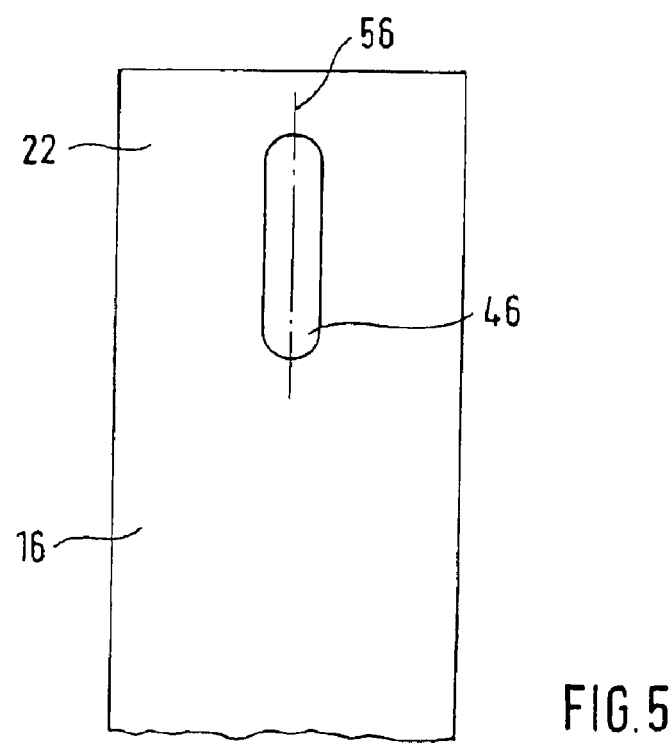
FIG. 5 shows a view from beneath of a valve leaf spring in the direction of the arrows V—V in FIG. 4.

In the additional exemplary embodiment of the invention according to FIGS. 4 and 5, parts that remain the same and function in the same way as in the preceding example are provided with the same reference numerals. In this instance, the surface 44 of the valve leaf spring 16 oriented toward the valve ball 18 is provided with a recess 46 into which a spherical segment 48 of the valve ball 18 protrudes in such a way that on the one hand, the crown 50 of the valve ball 18 contacts a bottom 52 of the recess 46 and on the other hand, a play space 55 remains on all sides between the edge 54 of the recess 46 and the valve ball 18. Preferably, the recess is constituted by a groove 46 extending along the longitudinal span of the valve leaf spring 16, as depicted in the view in FIG. 5, in which the valve leaf spring 16 is shown from beneath, without the valve ball 18. Preferably, the groove 46 does not extend over the entire length of the arm 22 of the valve leaf spring 16 oriented toward the valve seat, but instead extends a certain distance toward both ends starting from the center axis 28 of the valve seat 12. The play space 55 between the edge 54 of the groove 46 and the valve ball 18 should also permit tolerance-induced axial deviations between the center axis 28 of the valve seat 12 and a center line 56 of the groove 46 so that the valve ball 18 can execute centering movements in relation to the valve seat 12. Alternatively, instead of a groove 46, a circular blind hole or a blind hole with a polygonal or arbitrarily shaped edge can constitute the recess in the valve leaf spring 16.

In view of this, the pressure regulator 1 functions as follows: if fuel pressure prevails at the pressure inlet 8 that is of sufficient magnitude to generate a compressive force that is greater than the closing force acting on the valve ball 18, then the valve ball 18 lifts up from the valve seat 12 and unblocks a particular opening cross section so that fuel can flow into the interior 6 of the housing and from there to the pressure outlet 4. Due to the elastic properties of the valve leaf spring 16, the opening cross section increases with increasing fuel volumes, whereas the pressure difference between the pressure inlet 8 and the pressure outlet 4 only increases slightly and in approximately linear fashion.

The invention, however, is not limited to a pressure regulator of this kind. Rather, the pressure regulator according to the invention can also be a pressure regulator in which the magnitude of the outlet pressure differs from the inlet pressure and can be adjusted.

The foregoing relates to preferred exemplary embodiments of the invention, it being understood that other variants and embodiments thereof are possible within the spirit and scope of the invention, the latter being defined by the appended claims.

What is claimed is:

1. In a pressure regulator for a fuel delivery system of an internal combustion engine for regulating a fuel pressure, including a valve, which has a valve ball that is pressed against a valve seat in the closed position by the action of a valve leaf spring, the improvement comprising, a recess (37; 46) associated with the valve ball (18) or the valve leaf spring (16), and a segment (31; 48) of a hemisphere of the valve ball (18) oriented toward the valve leaf spring (16) protruding into the recess (37; 46), wherein the recess is constituted by an annular opening (37) of a damping ring (29; 29*a*), disposed between the valve ball (18) and a surface (35) of the valve leaf spring (16) oriented toward it, the damping ring being held against the valve leaf spring (16) by the valve ball (18).

2. The pressure regulator according to claim 1, wherein the segment of the valve ball (18) is constituted by a spherical segment (31; 48).

3. The pressure regulator according to claim 2, wherein the damping ring (29) is constituted by a ring that is comprised of an elastomer and has a circular cross section.

4. The pressure regulator according to claim 2, wherein the damping ring (29*a*) is comprised of a plastic formed body that is produced by means of cutting machining or by means of injection molding.

5. In a pressure regulator for a fuel delivery system of an internal combustion engine for regulating a fuel pressure, including a valve, which has a valve ball that is pressed against a valve seat in the closed position by the action of a valve leaf spring, the improvement comprising, a recess (37; 46) associated with the valve ball (18) or the valve leaf spring (16), and a segment (31; 48) of a hemisphere of the valve ball (18) oriented toward the valve leaf spring (16) protruding into the recess (37; 46) wherein the valve ball (18) contacts the valve leaf spring (16) and a slight amount of play (33; 55) is present between an edge of the recess (37; 46) and the valve leaf spring (16) or the valve ball (18).

6. The pressure regulator according to claim 2, wherein the segment of the valve ball (18) is constituted by a spherical segment (31; 48).

7. The pressure regulator according to claim 6, wherein the recess is constituted by an annular opening (37) of a damping ring (29; 29*a*), disposed between the valve ball (18) and a surface (35) of the valve leaf spring (16) oriented toward it, the damping ring being held against the valve leaf spring (16) by the valve ball (18).

8. The pressure regulator according to claim 7, wherein the damping ring (29) is constituted by a ring that is comprised of an elastomer and has a circular cross section.

9. The pressure regulator according to claim 7, wherein the damping ring (29*a*) is comprised of a plastic formed body that is produced by means of cutting machining or by means of injection molding.

10. In a pressure regulator for a fuel delivery system of an internal combustion engine for regulating a fuel pressure, including a valve, which has a valve ball that is pressed against a valve seat in the closed position by the action of a valve leaf spring, the improvement comprising, a recess (37; 46) associated with the valve ball (18) or the valve leaf spring (16), and a segment (31; 48) of a hemisphere of the valve ball (18) oriented toward the valve leaf spring (16) protruding into the recess (37; 46), wherein the segment of the valve ball (18) is constituted by a spherical segment (31; 48) and wherein the recess (46) is embodied on the surface (44) of the valve leaf spring (16) oriented toward the valve ball (18), and the valve ball (18) contacts a bottom (52) of the recess (46).

11. The pressure regulator according to claim 10, wherein the recess is constituted by a groove (46) that extends along the longitudinal span of the valve leaf spring (16).

12. The pressure regulator according to claim 11, wherein the groove (46) extends a certain distance toward both ends starting from the center axis (28) of the valve seat (12).

* * * * *